United States Patent [19]

Matey

[11] Patent Number: 4,481,616
[45] Date of Patent: Nov. 6, 1984

[54] SCANNING CAPACITANCE MICROSCOPE

[75] Inventor: James R. Matey, Mercerville, N.J.

[73] Assignee: RCA Corporation, New York, N.Y.

[21] Appl. No.: 307,021

[22] Filed: Sep. 30, 1981

[51] Int. Cl.³ .............................................. G11B 9/06
[52] U.S. Cl. ..................................... 369/58; 358/342; 369/126
[58] Field of Search ................... 369/58, 126; 358/342

[56] References Cited

U.S. PATENT DOCUMENTS

| | | | |
|---|---|---|---|
| 3,783,196 | 1/1974 | Stanley | 179/101.1 B |
| 3,842,194 | 10/1974 | Clemens | 178/6.6 A |
| 4,064,539 | 12/1977 | Lewiner et al. | 369/58 |
| 4,267,732 | 5/1981 | Quate | 73/606 |
| 4,307,419 | 12/1981 | Matey et al. | 369/58 |
| 4,325,134 | 4/1982 | Langley | 369/58 |

OTHER PUBLICATIONS

J. K. Clemens, "Capacitive Pickup and the Buried Subcarrier Encoding System for the RCA VideoDisc," RCA Review, vol. 39, No. 1, Mar. 1978, pp. 33–59.

R. N. Rhodes, "The VideoDisc Player," RCA Review, vol. 39, No. 1, Mar. 1978, pp. 198–221.

Abstract of a Seminar at Rutgers University of New Jersey on Sep. 8, 1981 on "Scanning Tunneling Microscope" by Dr. Gerd Binnig.

Primary Examiner—Raymond F. Cardillo, Jr.
Attorney, Agent, or Firm—Birgit E. Morris; Donald S. Cohen; Joseph D. Lazar

[57] ABSTRACT

Variations in topography and material properties of the surface layer of a body are observed in microscopic imaging using a scanning capacitance probe. The acronym SCaM identifying the process and apparatus is derived from the phrase scanning capacitance microscope. The material properties observable by SCaM are the surface-electric property representative of the complex dielectric constant of the surface material and the surface-mechanical property representative of the elastic constant of the surface material.

21 Claims, 14 Drawing Figures

SCANNING CAPACITANCE MICROSCOPE

This invention relates to microscopy and, more particularly, to microscopy utilizing capacitance signals generated from a capacitance probe scanned over the surface of a body of material.

BACKGROUND OF THE INVENTION

Microscopes are essentially devices which create maps or displays of the variation of some property of an object under study. Different types of microscopes map variations of different properties of a material to provide contrast in a generated image of the material.

Optical microscopy techniques can be used to generate maps of the variations of some properties of certain materials. However, diffraction effects and depth of field limitations present formidable difficulties when attempting to discern variations in the properties of materials in which the variations are on a scale of the order of 5–10 angstroms. Optical microscopes use light with wavelengths of the order of a few thousand angstroms; the resolution of optical microscopes, it should be noted, is at best about 2500 angstroms.

Electron microscopy techniques have been used in the mapping of very fine variations in topography of certain materials. However, the electron microscope, even though overcoming the diffraction and depth of field difficulties experienced by optical microscopes, nevertheless, is limited by its field of view. Moreover, electron microscopes have another limitation in that the preparation of a specimen of a material to be evaluated typically requires cutting an area or portion of interest out of the material in order to provide a specimen small enough to fit inside the vacuum chamber of the electron microscope.

Acoustic microscopy techniques are used to determine absorption spectra and the Raman frequency modes of material. See U.S. Pat. Nos. 4,028,933 and 4,267,732 for a detailed description of these techniques. Acoustic microscopes can be used to discern topographic, mechanical and thermal properties of a material. Acoustic microscopes, however, cannot discern electrical properties of materials.

Furthermore, optical, electron and acoustical microscopes provide a common difficulty in that they can present a great number of extraneous features which are not relevant to certain kinds of material evaluation.

In the art of video disc records, and the manufacture of the discs useful in the art, it is important to be able to determine certain properties of the disc.

It is known that the video disc that has been recorded with information comprising both video and audio signals still contains in the playback mode extraneous signals which are termed noise. These noise signals contribute deleteriously to the quality of the video and audio signals that are eventually displayed in a TV-monitor. Variations in the (1) geometry of the groove or what may be termed variations from the desired topography, (2) the mechanical stiffness of the groove, or more particularly, the mechanical stiffness of the surface layer of the material and (3) the complex dielectric of the material of the disc all contribute to the noise signals. While it is desirable that these properties be identified, no known process heretofore has been able to provide such information. The optical, acoustic, and electron microscopes can, in principle, discern variations in the geometry. However, in practice, optical and acoustic microscopy of the variation of the groove geometry of concern in the video disc art is impossible because the variations of interest are more than 1,000 times smaller than the groove itself and because the dimensions of the variation of interest are at or beyond the limits of optical microscopes.

Electron microscopes can discern the variations of geometry which are of interest, but only over such a small field of view as to make the interpretation of a display from an electron microscope very difficult. Electron microscopes also probe fairly deeply into the surface of the material of a disc, thereby further complicating interpretation of the displays, which are usually in microphotograph (or, simply, "micrograph") form. There is a need, therefore, for a system that functions as a microscope to provide detailed and enlarged mapping displays manifesting or representing the variations in the properties of the surface of materials.

SUMMARY OF THE INVENTION

The present invention comprises a method for determining variations in the topography and material properties of the surface layer of a body of material by scanning the surface of the body with a capacitance probe to generate a signal representing capacitance variations between the surface and the probe.

An image of the surface of the body is formed by scanning a recording medium in synchronism with the scanning probe and recording on that medium the capacitance signal from the probe in such a manner that it may be viewed by an observer as variations in brightness or color of a two-dimensional map of the surface of the body. Topography and the material properties of mechanical stiffness and complex dielectric constant can be discerned from the display.

DETAILED DESCRIPTION OF THE PREFERRED EMBODIMENTS OF THE INVENTION

The invention can be practiced by utilizing mechanical scanning systems of the type known generally in the video disc playback art and the art of acoustical microscopy. In general, the invention can be practiced with systems in which a scan is made or effected over a surface in either polar coordinates or in rectangular coordinates. The principle of the microscope of the invention is illustrated by the block diagram shown in FIG. 1. The process of the invention for determining certain properties of the surface layer of material is a form of microscopy based on the priciple of scanning capacitance techniques provided for different purposes in the video disc playback system developed by RCA. A detailed description of the convention video disc playback system is described in the RCA Review, Vol. 39, March 1978, pp. 198–221, in an article entitled "The Video Disc Player" by R. N. Rhodes.

Figure 1:
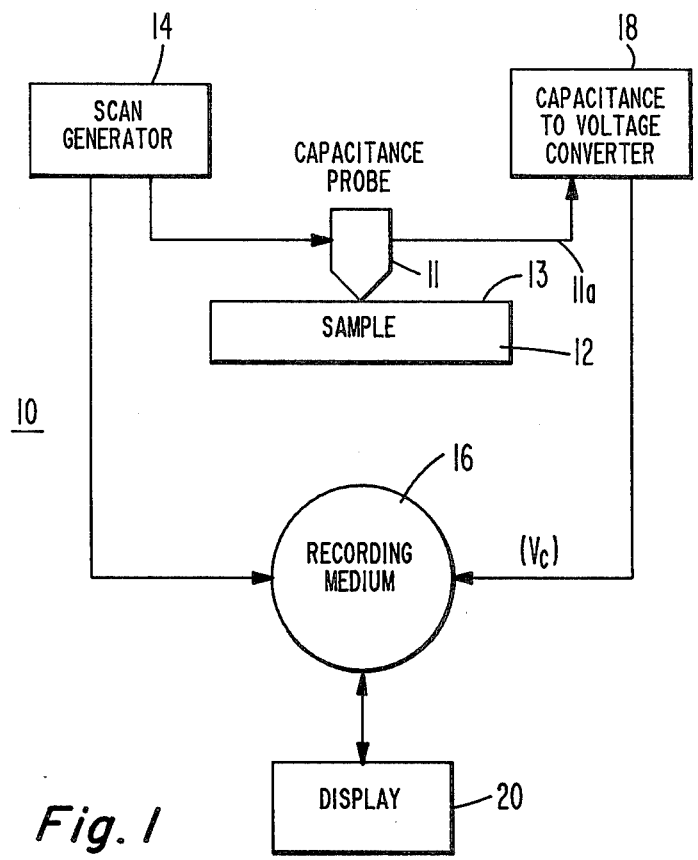
FIG. 1 is a block schematic of a system embodying the present invention.

The scanning capacitance microscope 10 of the invention as shown in FIG. 1 is comprised of a capacitance probe 11 scanned relative to the surface 13 of a sample 12 by a scan generator 14 which causes a recording medium 16 to be scanned in sychronism on a one-to-one basis so that each location on the recording medium corresponds to a respective surface location on sample 12. Capacitance variations between the probe 11 and the sample 12 are sensed by a capacitance to voltage converter 18 which applies a voltage signal $V_c$ to medium 16 that varies with the capacitance variations. The recorded signal $V_c$ is applied to a display 20 such as a CRT to provide an observable map of variations in capacitance sensed by the probe 11 as it is scanned over the surface 13 of sample 12. The mapped variations can be viewed as variations in brightness or in color manifesting the capacitance variations. The acronym SCaM derived from scanning capacitance microscope may be used to identify the microscope of this invention.

In general, the capacitance variations between the probe 11 and the surface 13 of the sample 12 result in a voltage signal $V_c$ that, in brief, varies with (1) the topography of the surface, i.e. the height of the probe 11 over the surface 13, and (2) the electrical properties of the material of the sample 12 beneath the probe, i.e., the complex dielectric constant and (3) the mechanical properties of the material beneath the probe.

A description of the complex dielectric constant which defines both the resistive as well as the dielectric properties of a material is described, for example, in *Introduction to Solid State Physics*, 4th Ed., Chapter 13, by C. Kittel.

Unfortunately, the signal $V_c$ cannot be analyzed or processed directly by any known technique to separate or identify one material property from the other. According to this invention, various techniques are used, as will be described in detail hereinafter, to identify with a high degree of accuracy the material property of interest.

Figure 2:
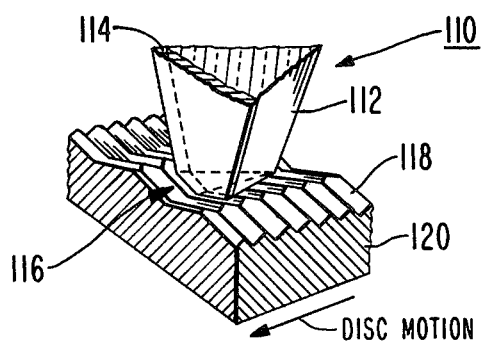
FIG. 2 is a schematic of a capacitance probe suitable for practicing one form of the invention embodied as a stylus riding over a grooved disc.

The microscope apparatus 10 of FIG. 1 can be implemented using a probe 110 as shown in FIG. 2. Probe 110 is formed of a stylus 112 carrying a relatively thin electrode 114 over a disc 120 in motion in the direction as shown by the arrow. The stylus 112 rides in the grooves 116 and supports the electrode 114 over the grooves 116 into which are undulations 118 corresponding to recorded signals as effected by the RCA video disc system.

The capacitance-to-voltage converter 18 is suitably any known converter that responds to a capacitance varying input to provide an output voltage signal representing capacitance variations.

The recording medium 16 and display 20 may be, for example, embodied as an oscilloscope equipped with a camera. In such an arrangement the camera functions as the display 20 and the oscilloscope functions as the recording medium 16. If desired, the recording medium 16 may be the display on a real time basis.

Figure 3:
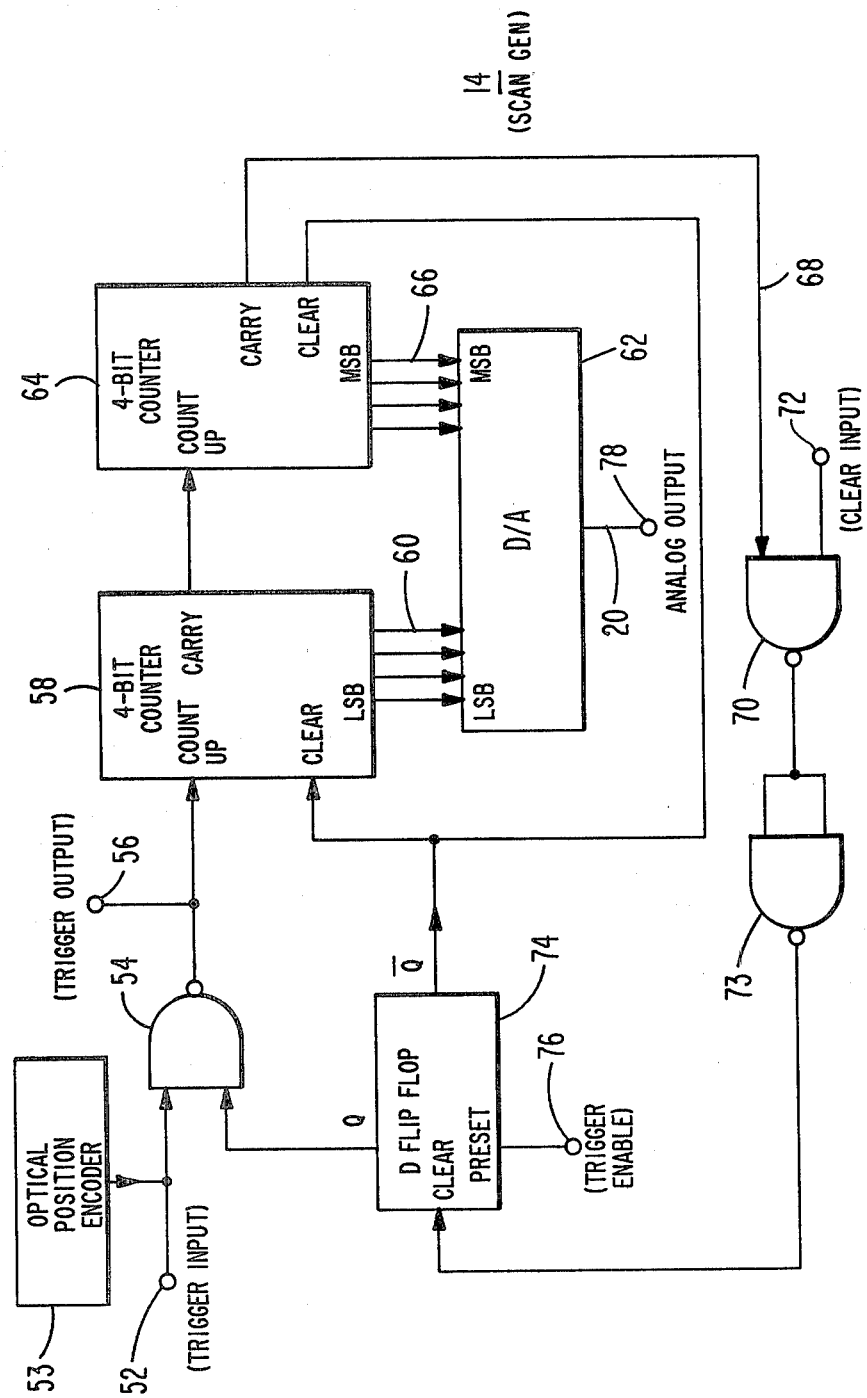
FIG. 3 is a block schematic of a scan generator useful in practicing the invention.

The scan generator 14 can be of a suitable form functioning to effect a relative scan movement of the probe 11 and the sample 12, such as a rotating disc carried by a turntable. One form of raster scan generator utilized for a disc is shown in FIG. 3 to be described. Reference is made to copending application Ser. No. 143,028, filed April 23, 1980 by J. R. Matey and C. R. Corson, entitled "Scan Generator For Use With Video Disc Apparatus" now U.S. Pat. No. 4,307,419, issued Dec. 22, 1981, for a description of a preferred form of the scan generator 14 for generating signals to scan a video disc player in synchronism with a CRT display 20, which application is incorporated herein by reference. A detailed description of a suitable capacitance probe, corresponding to FIG. 2 herein, is described in the RCA Review, Vol. 39, March 1978, pp. 33–59, in an article by J. K. Clemens entitled "Capacitive Pickup and The Buried Subcarrier Encoding System for the RCA Video Disc."

While the scan generator disclosed in the above-identified application Ser. No. 143,028 is a preferred form of the generator for a video disc apparatus, a suitable scanning generator 14 designed and built before the generator described in the application S.N. 143,028 is illustrated in FIG. 3 to which reference is now made. FIG. 3 illustrates in block schematic form one illustrative example of a scanning generator used as a raster generator for an oscilloscope display 20 (FIG. 1) of the capacitance signals derived from a video disc playback system. A suitable oscilloscope is a Tektronix Model 7904 having X, Y and Z inputs.

The raster generator 14 of FIG. 3 responds to triggered inputs at terminal 52 from the video disc 120 (FIG. 3) being scanned by probe 110. The timing signals are derived by mounting an optical position encoder not shown on the video disc player in a position proximate to the rim of the video disc 120. An opaque flag (not shown) is attached to the rim of the player in a position to interrupt the internal light source of the encoder whereby pulses are produced at the turntable once-around frequency and supplied to the input terminal 52 of the raster generator by the optical position encoder. The output of the video disc player pickup transducer probe 110 is coupled via path 11a to the input of the capacitance-to-voltage converter 18 as shown in FIG. 1. The triggered signals at terminal 52 are applied to a NAND gate 54 whose output is coupled to the triggered output terminal 56 and to the count-up input of a four-bit counter 58. The output of counter 58 is coupled via a four lead bus 60 to a digital to analog (D/A) converter circuit 62. Carry signals from the counter 58 are applied to the count-up terminal of a four bit counter 64 whose count output is carried via a four wire bus 66 to the most significant bit (MSB) inputs of the terminals to the D/A circuit 62. The carry output of the counter 64 is applied via path 68 as one input to the NAND gate 70, the second input being derived from a manually introduced "clear input" signal at terminal 72. The output of NAND gate 70 is conveniently coupled to a NAND gate 73 whose output is applied as the clear input to a D-flip flop (FF) 74. FF 74 is triggered by a suitable trigger-enable signal, via terminal 76, to preset the flip flop. The Q output of the flip flop 74 is applied as the second input to NAND gate 54.

The raster scan generator circuit 14 of FIG. 3 serves to synchronize a raster scan on oscilloscope to the motion of the video disc 120. In this way, the rotational movement of the disc 120 is synchronized to a raster scan for display of the capacitance signals applied to the intensity signal input of the oscilloscope. The two counters 58 and 64 serve together as an 8-bit binary counter which drives the D/A 62. The sequenced inputs to the counters 58 and 64 are derived from the angular position triggered via terminal 52 by the NAND function of gate 54 with the D flip flop 74. Flip flop 74 is set by a manual switch via terminal 76 and is cleared by the counter's (64) carry signal via path 68 and gates 70 and 73. The input pulses to the counter 58 are also used to trigger the horizontal time base of the oscilloscope via terminal 56. The output of the D/A 62 is used to drive the vertical amplifier of the oscilloscope via terminal 78. Suitable logic (not shown) may be used to permit the circuit 14 to be reset manually.

When the flip flop 74 is set, via terminal 76 and a series of angular position triggers, via terminal 52, is applied to the circuit, a single raster scan will be generated at the oscilloscope. The start of each horizontal line of the oscilloscope will be synchronized or time-locked to a particular angular position on the video disc 120 (FIG. 2), and successive lines will correspond to successive grooves 116 on the disc 120. It should be understood that the video disc 120 is being operated in the conventional mode in which the probe 110 is riding in the groove, as described in U.S. Patent 3,783,196 issued on January 1, 1974 to T. O. Stanley, or U.S. Patent 3,842,194 issued on October 15, 1974 to J. K. Clemens. Thus, the raster X and Y axes of the oscilloscope will correspond to tangential and radial axes on the video disc 120. The output of the converter 18, in practice the video disc preamplifier, not shown, is a signal which manifests the probe-disc capacitance. This signal is applied to the Z axis of the oscilloscope to provide intensity modulation of the raster on the CRT display 20 of the oscilloscope.

Figure 4:
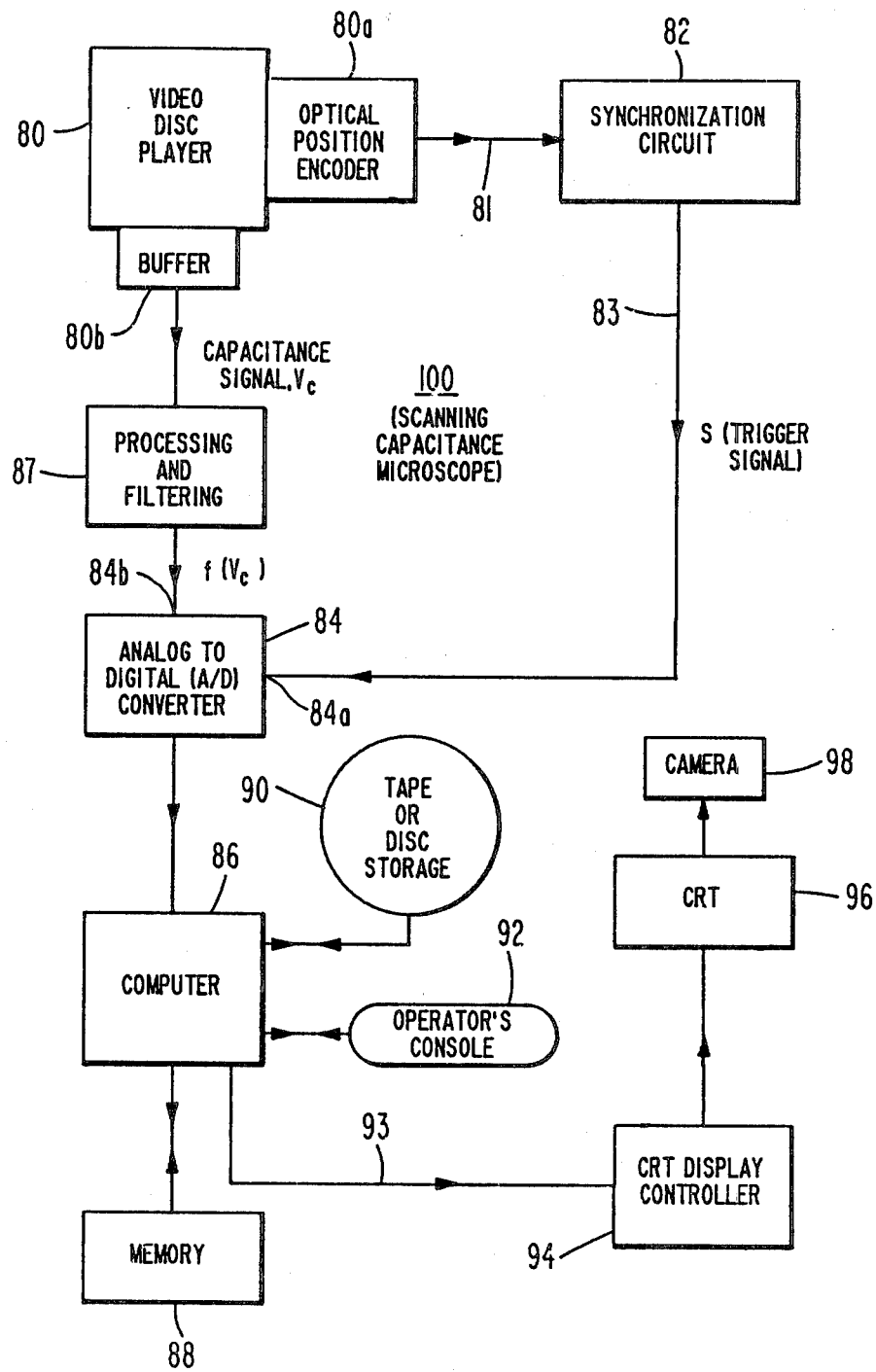
FIG. 4 is a block schematic of a preferred system for practicing the invention utilizing video discs.

Reference is now made to FIG. 4, in which there is shown a schematic of a preferred form of the scanning capacitance microscope useful in practicing the method of the present invention. The microscope 100 is essentially an RCA video disc player modified to provide scanning synchronization and to provide access to the capacitance signal generated by the player's capacitance probe. The video disc player 80 is provided with an optical position encoder 80a which generates a synchronization signal on path 81 to a synchronization circuit 82. Encoder 80a, similar to encoder 53 shown in FIG. 3, is positioned on the video disc player turntable in relationship to an opague flag or indicator mounted on the turntable (not shown) to provide a signal on each revolution or rotation of the disc on the turntable. Once during each revolution of the disc, synchronization circuitry 82 functions to provide a trigger signal S on path 83 to a first input 84a of an analog to digital (A/D) converter 84.

The player 80 is further modified with a buffer 80b which is coupled to the output of the capacitance probe 110 (of FIG. 2) to provide an analog capacitance signal, Vc. Buffer 80b is suitably a kiethley type 104 wide band amplifier. Buffer 80b serves as an impedance matching network. Capacitance signal Vc is applied to a processing and filtering circuit 87 which functions to generate the signal f (Vc). Filtering circuit 87 is selected to process the capacitance signal in accordance with the desired use of the microscope 100. In the simplest embodiment, circuit 87 is simply a low pass filter designed to eliminate aliasing effects in the digitizing process by the A/D converter 84. A more complicated embodiment would be a circuit that provides a logarithmic ratio of the power of the capacitance signal Vc contained in, for example, two spectral ranges, for example, 500 kHz ±15 kHz, and 715 kHz ±50 kHz, thereby generating a map corresponding to differences between the combined noise and signal powers in these two ranges.

The processed signal f (Vc) is applied to the second input 84b of the converter 84. The converter provides 512 samples of the signal at some fixed rate, for example, 10 MHz for each trigger signal S. The samples derived from the converter 84 are applied to a computer 86 which in turn transfers the data into a block of the digital memory 88. Computer 86 is suitably a Data General Nova IV. The memory 88 is a conventional digital memory usually included as peripheral equipment for computer 86. A tape or disc storage 90 is coupled to the computer 86 for storing data derived by the computer and an operator's console 92 is provided in conjunction with the computer 86 to control the computer.

A CRT display controller 94 receives the stored data from computer 86 via path 93 and applies the data to a CRT 96 suitably provided with a camera 98. The controller 94 is suitably a Lexidata Image Processor, Model 3400.

Controller 94 maps the sample values into variations in intensity, and color, (actually pseudo-color variations) if desired, on the CRT 96, thereby generating a map of the signal f (Vc) as a function of position on the surface of the disc 120. The mapping on the CRT is normally polar-to-rectangular mapping in which radial lines on the disc are mapped into vertical lines on the CRT 96 and arcs of a groove are mapped into horizontal lines. The magnification of the resulting image on the CRT 96 is determined by the groove pitch of the disc 120 in one direction and by the sampling rate in the other direction. The point-to-point resolution of the scanning capacitance microscope 100 of FIG. 4 is determined by the groove pitch in one direction and by the resolution of the stylus in the other direction. Further details of the magnification and resolution of the microscope will be described hereinafter.

The computer 86 can be arranged to retrieve data from the memory 84 and store it for subsequent processing on magnetic tape or disc 90. Moreover, the computer 86 can be programmed to perform fast Fourier transform (FFT) spectral estimates of the images in one and two dimensions, and to compare images via coherence and correlation techniques which are well known in the art of digital image processing.

Figure 5A:
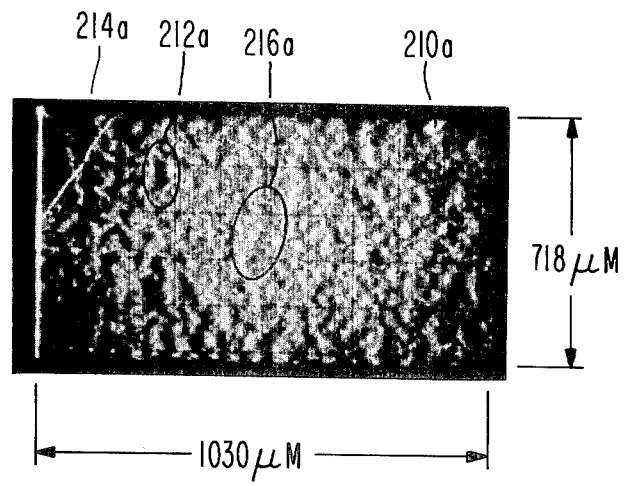
FIGS. 5a and 5b are micrographs illustrating the capacitance microscope display of a surface portion of a video disc containing no recorded signals.
Figure 5B:
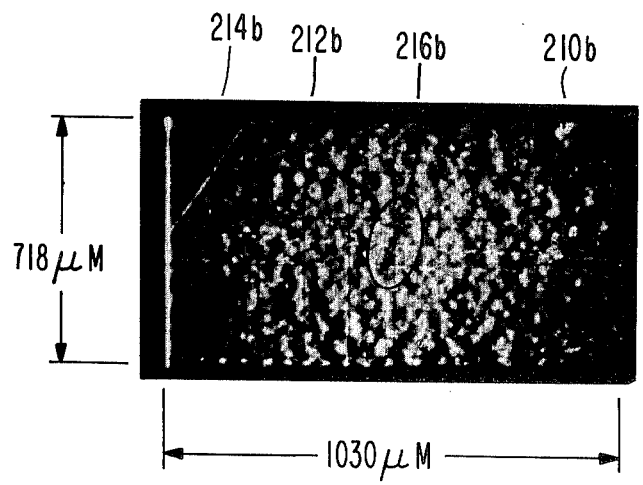

The display on CRT 96 represents a signal that manifests variations in the capacitance varying signals derived from the probe 110 scanning over the surface of the video disc 120. Typical micrographs made from the CRT display are shown in FIGS. 5a and 5b, to be described in detail hereinafter.

The probe 110 is typically formed of a body made of either sapphire or diamond. The stylus 112 and its electrode 114 (FIG. 2) ride in the grooves 116. The probe 110 is usually a triangular shape having a size of 2 micrometers across the groove and 5 micrometers along the groove. The electrode thickness is usually 1000–5000 angstroms. As the probe 110 rides over the disc surface, the voltage $V_c$ is responsive to variations (1) in the topography of the groove 116, (2) in the complex dielectric constant of the disc 120 and (3) in the surface-mechanical properties of the disc 120 which give rise to changes in the amount of deformation of the groove under the stylus. The surface-mechanical properties are determined by the Young's modulus and the shear modulus of the material.

Reference is now made to the following Table 1 which summarizes certain dimensions of various topographic structures of a typical video disc 120 to which the probe 110 can respond.

TABLE I

| (1) | Groove width (Pitch) | 2.6 microns |
|---|---|---|
| (2) | Groove depth | 0.4 microns |
| (3) | Video carrier wavelength | 0.1 microns |
| (4) | Audio carrier wavelength | 10.0 microns |
| (5) | Video carrier amplitude | 0.08 microns |
| (6) | Audio carrier amplitude | 0.008 microns |
| (7) | Amplitide of noise signal down 60 db from video carrier | 0.0001 microns |
| (8) | Amplitude of noise signal down 30 db from audio carrier | 0.0003 microns |

As seen in Table I, the probe 110 has a point-to-point resolution of 0.1 microns (also termed "micrometers") along a groove (as determined by the video carrier wavelength, item 3) and of 2.6 microns, the groove pitch (item 1) along a radial line. Moreover, the probe 110 can respond to variations in the depth of a groove (item 2) from a nominal depth of the order of 0.0001 microns (item 7), even when the length of the variations is orders of magnitude larger than its height. A stylus of this type is the most sensitive probe known for such topographic variations. Accordingly, when the probe 110 is used in the scanning capacitance microscope 100, for example, features of the surface of a video disc 120 can be observed that are not observable by any other known microscopic technique. Thus, the microscope 100 is sensitive to topographical, surface-electrical and surface-mechanical properties of the sample.

The capacitance signal ($V_c$) represents the capacitance between the probe electrode 114 and the conductive surface of the video disc 120 (FIG. 2). The value of capacitance decreases as the distance between the electrode and the surface increases.

In general, the capacitance between any two conductors is determined by the geometry of the conductors and the dielectric constants of the material(s) which lie between the two electrodes. In the contact-probe version of the present invention as illustrated in FIG. 2, the geometry of the electrode-sample interface is determined by the geometry of the electrode, the topography of the sample, and the deformation of the sample caused by the probe. The deformation is in turn dependent on the mechanical properties of the surface of the sample. In order to calculate the capacitance, one would first need to solve the (very complicated) mechanical interaction problem, then use that result to provide the boundary conditions for an (also very complicated) electrostatic problem. In general, the capacitance (C) is a function of the form:

$$C = f\{\text{dielectric constant of sample surface layer } (x,y), \text{mechanical properties of sample surface layer } (x,y), \text{topography of sample surface layer } (x,y)\} \quad (1)$$

where x and y are the coordinances of a point on the surface of the sample. In the case of the non-contact version of the present invention to be described (FIGS. 10a and 10b), the mechanical properties of the sample would not be of concern since the sample would not be deformed by the contact of the probe.

A grossly simplified model of the capacitance between the probe and the sample surface is described by Clemens in his above-identified article.

It is well understood that a mere change in elevation or difference in spacing between the electrode of the probe and the conducting portion of the video disc manifests a signal which is a function of spacing or height. Moreover, as understood in the art, a change in the dielectric constant (more precisely, the complex dielectric constant) of the material between the electrode 114 of the probe 110 and the video disc 120 will also change or affect the capacitance that is sensed by the probe 110. Furthermore, if the probe 110 were to be passed over the surface of material, for example, of a video disc whose mechanical stiffness varied from point to point, the capacitance probe 110 would manifest this variation by a varying capacitance signal. Accordingly, depending upon the conditions of operation of the probe 110 scanning the surface of the video disc 120, one can generate capacitance signals that will be functions of variations of (1) topography, (2) complex dielectric constant, and (3) the mechanical properties.

While the properties of the video disc generate capacitance signals that vary with the changes in the properties, it is difficult at the present state of the art to discern or discriminate one property-varying signal from the other, as mentioned above. Thus, any display of variations in the capacitance signal will represent, in general, the combined variations in the three properties without any way of directly separating or discriminating one varying property from the other.

Accordingly, a general use of the invention contemplates a display of a capacitance signal derived from a video disc to be indicative of the combined changes in the properties of topography, dielectric constant and mechanical properties. This indication may be adequate for certain purposes in quality control of a video disc whether or not the disc is already provided with recorded video and audio information signals.

One application of the invention is related to understanding the processes which give rise to noise in the RCA video disc system. In particular, the questions that arise are a determination of the source of noise as to whether it is caused by the structure of the disc, or by defects in the process of making the disc, or in the signal that is being recorded on the disc. Experiments using the invention to determine the source of noise have been done by using the scanning capacitance microscope 100 (FIG. 4) to develop a micrograph of some region of a disc (e.g., disc 120; FIG. 2) under well-controlled conditions. A second micrograph is then made of some region of the same disc or, indeed, some other disc. The two micrographs are then compared visually and also by means of numerical coherence and correlation algorithms, both processes being well known in the art of digital signal processing.

For example, the fraction of the noise power in a given bandwidth which is caused by static (fixed) features on disc (120) can be determined by comparing two micrographs of the same region of a disc taken by two respective scans under identical conditions. Two such micrographs are shown, respectively, in FIGS. 5a and 5b of two scanning plays. As can be seen visually on these micrographs, the large defects 210a, 212a, 214a (FIG. 5a) 210b, 212b, 214b (FIG. 5b) on the disc surface remain in place from scan-to-play. Moreover, closer inspection of the micrographs of FIGS. 5a and 5b shows that the fine structure at 216a and 216b, respectively, of the disc which results in noise in the video disc system also repeats from scan-to-scan.

More specifically, the defect 210a in FIG. 5a is repeated as defect 210b as shown in micrograph FIG. 5b. Similarly, the defect 212a in FIG. 5a is repeated in the micrograph of FIG. 5b as defect 212b. A surface scratch 214a in FIG. 5a is repeated as the surface scratch 214b in the micrograph FIG. 5b. The fine structure 216a of FIG. 5a is repeated as 216b of FIG. 5b. Since the two micrographs of FIGS. 5a and 5b can be stored in numerical form in the memory 88 (FIG. 4), it is straightforward to compute the two dimensional cross-correlation function between the two micrographs. A maximum in the cross-correlation function of about 0.9 is typical using a bandwidth extending from 100 kHz to 2 MHz. The magnitude of this maximum implies that about 90% of the noise power in the measured bandwidth is a result of features on the surface of the disc. The remaining 10% of the noise power it seems is not caused by static features on the disc. It is speculated that the remaining 10% may be caused by 1/f noise in the disc material and by noise in the capacitance-to-voltage converter used in this embodiment.

In a similar manner comparison can be made between two micrographs taken of corresponding areas of different discs pressed from the same stamper or of two discs pressed from two different stampers generated from the same master to determine if surface features responsible for the noise are present in the stampers or in some earlier stage of the replication process.

It is moreover possible to determine the relative importance of topography, electrical property variations, and surface mechanical property variations to noise generation by comparing micrographs of the same region of a disc before and after treatment which would affect one property in a different manner from the other properties.

Metallic coatings are one class of treatments which differentiate between topographic, mechanical property and dielectric constant variations. As an example, a conformal metal coating which is 3-4 times thicker than the Thomas-Fermi screening distance will shield the capacitance probe from variations in the dielectric properties of the sample. The concept of the Thomas-Fermi screening distance is discussed in C. Kittel, *Introduction to Solid State Physics*, 4th Ed., Chapter 8. Since the Thomas-Fermi screening distance is less than 20 angstroms for most common metals, it is clear that a conformal metal coating of about 100 angstroms will effectively shield the dielctric property variations. At the same time, a 100 angstrom metal coating is not thick enough to significantly change the mechanical properties of the surface layer of many materials. The effect on the mechanical properties can be estimated in a simplified geometry using perturbation theory and the Green's function solution to the problem of the deformation of the surface of a sample by an external pressure distribution. For a sample composed of PVC, a stylus geometry similar to that shown in FIG. 2, and a coating of gold 100 angstroms thick, the estimate is a 10% increase in the effective Young's modulus of the sample above that for a pure PVC sample.

The estimate can be calculated for other thicknesses and other sample materials and stylus geometries. By an appropriate choice of thickness, material and geometry, the effect of the metal coating on the mechanical properties of the surface of the sample can be made large. In this case, the stylus would then be shielded from variations in the mechanical properties of the sample material, i.e., it would only be sensitive to the mechanical properties of the metal coating. Hence, a thick metal coating can shield the stylus from both mechanical and electrical property variations. SCaM micrographs according to the invention made under such conditions would thus manifest only variations in the topography of the surface of the sample.

Figure 6A:
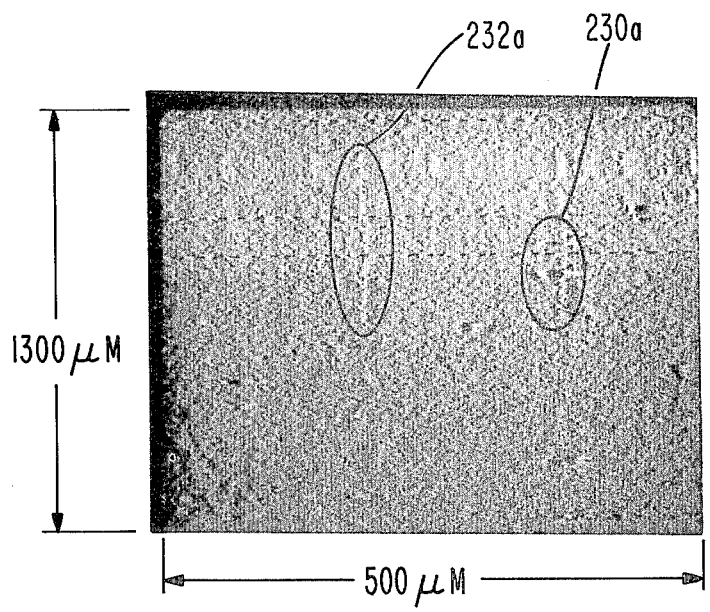
FIGS 6a and 6b are micrographs of the surface of a disc before and after, respectively, the disc has been coated with a metal.
Figure 6B:
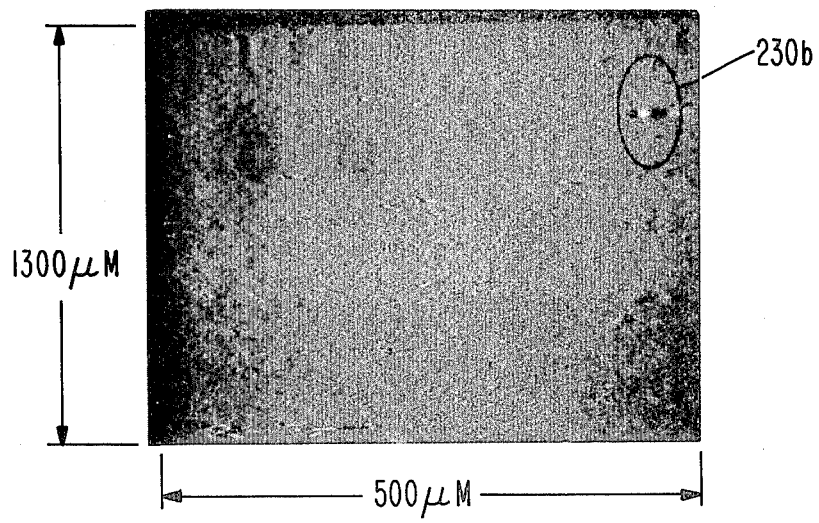

Two micrographs of the same region of a smooth-groove disc, taken before and after coating with 200 angstroms of a nickel-chromium alloy of a type known in the manufacture of metal coated video discs, are shown in FIGS. 6a and 6b, respectively. Defect 230a of FIG. 6a appears as defect 230b of FIG. 6b, thus indicating that this defect is caused by either a topographic or mechanical property variation. Moreover, defect 232a of FIG. 6a is not found in the micrograph of FIG. 6b, manifesting that the defect 232a is the result of an electrical property variation. A more detailed comparison of the two micrographs using numerical correlation algorithms indicates that about 50% of the noise between 100 KHz and 2 MHz is due to variations in the electrical surface of the disc.

It will now be appreciated that the invention can be practiced in various modes to determine the properties of the material. One method of determining the importance of variations in the mechanical properties is to vary the pressure or force that the probe exerts on the surface of the material and to then compare micrographs taken using different forces and pressures.

Figure 7:
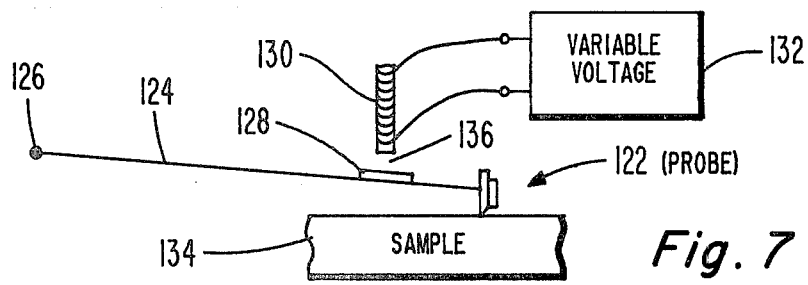
FIG. 7 is a schematic of a modified form of a capacitance probe for developing a variable contact force.

In order to adjust the pressure or force of the probe on the surface, a special variable force probe is needed. Reference is made to FIG. 7 illustrating an example of such a variable force probe. A probe 122 having a stylus and electrode portion is attached to an arm 124 pivoted about point 126. A permanent magnet 128 is positioned at a location on the arm 124 in proximity to an electromagnet 130. The electromagnet 130 is energized by a variable voltage source 132. The probe stylus 122 is arranged to ride on the surface of the sample 134. The gap 136 between the end of the electromagnet 130 and the permanent magnet 128 is such as to affect the magnetic coupling between the two members. The electromagnet and the permanent magnet are appropriately poled with the corresponding north and south poles thereof to effect the desired magnetic field. Variations in the voltage source 132 effects a variable magnetic flux of the electromagnet 130 to change the force on the arm 124 and thus of the probe 122 on the surface of the sample 134. In this way one can effect a desired force.

While the embodiments described hereinabove have been based on the RCA video disc playback system by which the material properties of a video disc are analyzed, the invention may be useful in other environments. For example, while the video disc of the RCA system utilizes grooves on which the capacitance probe is guided, video discs may be formed with spiral information tracks formed on the surface instead of in a groove. In such a system the capacitance probe is servoed over the surface to follow the spiral information tracks. The microscope of the present invention can be easily arranged to scan the surface of such a disc. Another field of use of this invention is in the field of semiconductors. Thus, the invention can be utilized by suitable modification to determine the properties of a semiconductor wafer or chip as will be apparent to those of skill in the art in view of the description made hereinabove. For example, reference is made to FIG. 8 which illustrates a system by which a semiconductor wafer may be scanned by the scanning capacitance microscope (SCaM) of the invention.

Figure 8:
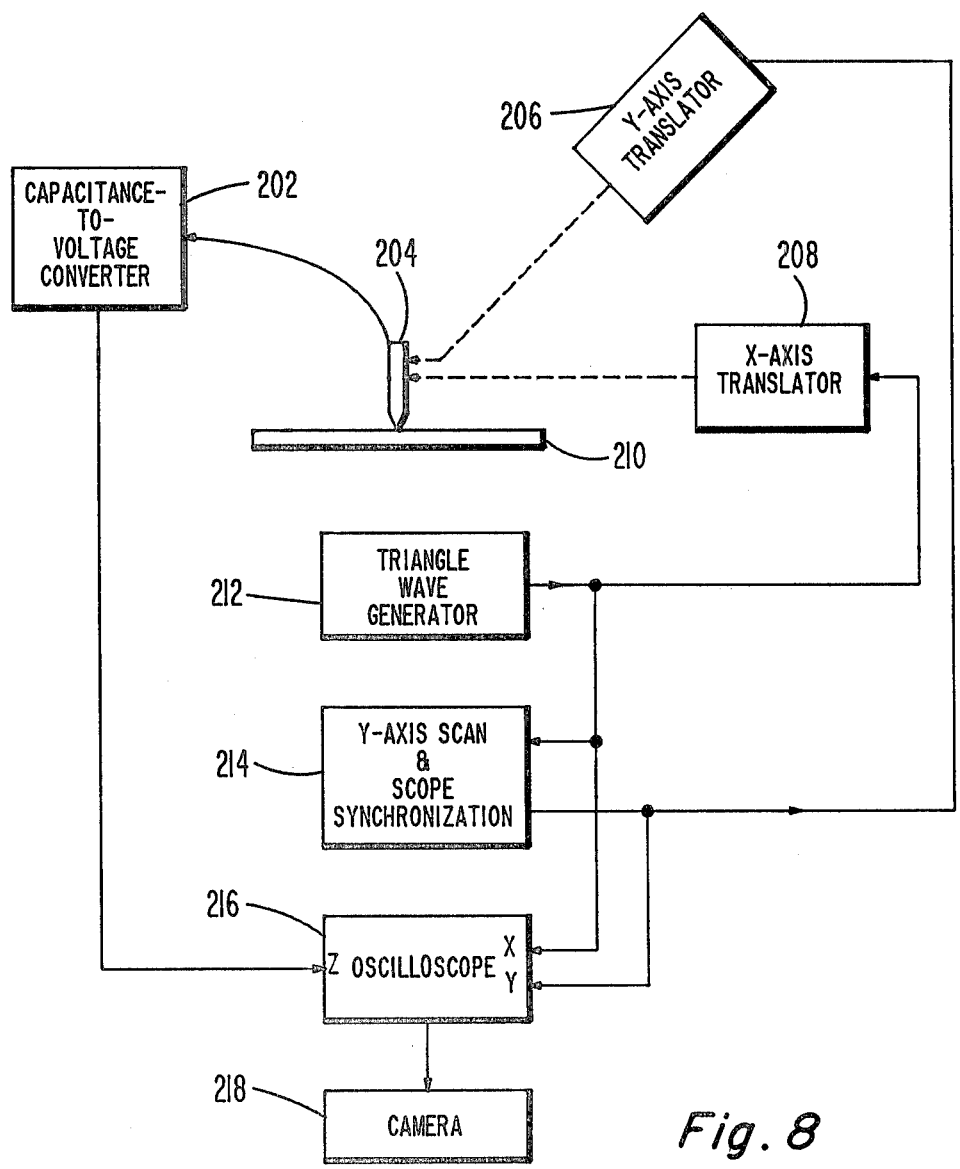
FIG. 8 is a schematic of a system for scanning a probe in x-y coordinates.

In the embodiment of the invention illustrated in FIG. 8, a capacitance probe 204 of the type used in the RCA Video Disc system as described above, is scanned over the surface of a sample 210 using X and Y translators 208 and 206, respectively.

Each translator may be any suitable device for effecting X and Y translation of the probe. See, for example, the translators described in the above-identified Quate patent 4,267,732, which are of the type known as a voice coil translator, commonly used in audio speakers, and arranged to be driven by an audio oscillator. In one embodiment of the invention such a translator used to effect velocity correction of the stylus in the RCA Video Disc playback system was adapted to effect the desired X or Y translation of the probe of this invention. See, for example, U.S. Patent 3,983,318, issued to M. E. Miller and J. G. Amery on September 28, 1976 for a description of a voice coil translator used to achieve velocity correction in the video disc player. The transducer assembly described in that patent may be adapted for use as either the X or Y translator 206 and 208 of this embodiment. In the alternative, one may use a piezoelectric transducer of the type disclosed in U.S. Patent 4,162,511, issued to M. Toda, et al. on July 24, 1979 for the translator mechanism.

The scanning movement is under control of a triangle wave generator 212. Generator 212 provides a triangular wave at a frequency of 20 Hz applied simultaneously to the input of translator 208, the input to the Y axis scan 214 and to the X input of an oscilloscope 216. The generator 212 is suitably an Interstate Model F77. Translator 208, responding to the triangular wave from generator 212, causes the probe 204 to be moved in a linear motion over the sample 210 for a distance of about 300 micrometers for each cycle of the triangular wave.

The Y axis scan and synchronization circuit 214 in response to the triangular wave from generator 212 provides a control signal for the Y axis translator 206 as well as the input to the Y axis input of oscilloscope 216.

The circuit of 214 may be implemented using the circuit described above as shown in FIG. 3. In the alternative, the circuit described in the above-mentioned patent application of Matey and Corson, Ser. No. 143,028, now U.S. Pat. No. 4,307,419 may be used for circuit 214. If the circuit of FIG. 3 is used for the scan and synchronization circuit 214, the output of the triangular wave generator 212 is coupled to the trigger input 52, in lieu of the optical position encoder 53 shown in FIG. 3. In addition, the analog output on path 20 to terminal 78 in then coupled to drive the Y axis translator 206. Since the analog output of FIG. 3 at terminal 78 thereof will increase by one step of the digital-to-analog (D/A) converter 62 for each cycle of the triangular wave from generator 212, the probe 204 will be moved across the sample 210 in a rectangular raster.

Since the same voltages which are applied to the X translator 208 and the Y translator 206 are also applied to the X and Y inputs of the oscilloscope 216, the beam of the oscilloscope will generate a geometrically similar raster on the screen of the oscilloscope.

The output capacitance voltage signal from probe 204 is coupled to a capacitance-to-voltage converter 202 of the type similar to converter 18 illustrated in FIG. 1. The converter output of converter 202 is applied to the Z-axis of the oscilloscope 216. The input to the Z-axis thereby generates variations in the intensity of the raster causing an image of the sample 210 as in the manner described hereinabove. Moreover, a camera 218 may be used to record the image displayed by the oscilloscope 216.

Figure 9A:
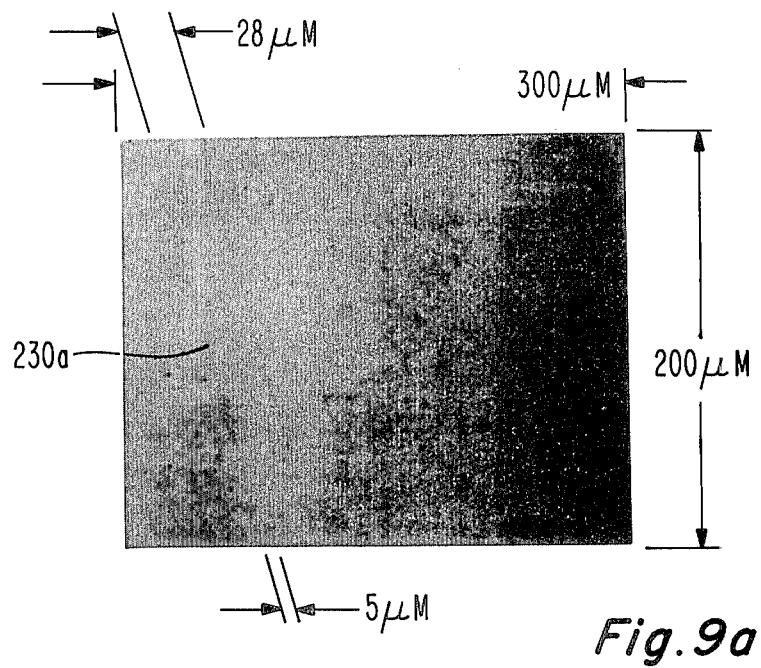
FIG. 9a is a micrograph of the surfade of a semiconductor taken using optical microscopy and FIG. 9b is a microgrpah of the surface of the same semiconductor wafer mapped with a system illustrated in FIG. 8.
Figure 9B:
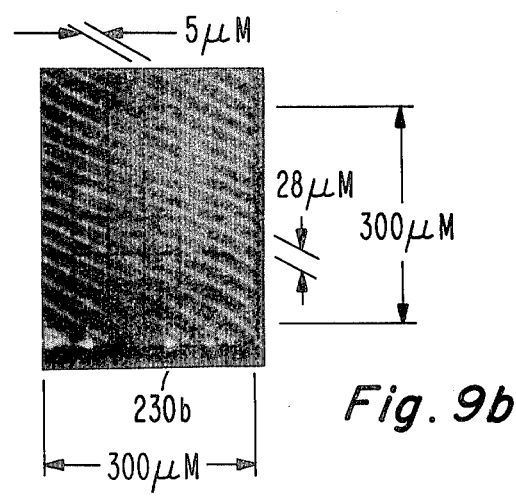

Reference is made to FIGS. 9a and 9b. The micrograph of FIG. 9a is that developed by an optical microscope of a silicon wafer having metallic gratings suitably formed on the surface thereof. The grating spacing is 28 $\mu$m and the height is 200 angstroms. The width of the grating lines is about 5 $\mu$m. One grating line is seen in the drawing FIG. 9a as 230a.

The micrograph of FIG. 9b was generated by the scanning capacitance microscope illustrated in FIG. 8. FIG. 9b shows another portion of the same silicon wafer shown in FIG. 9a. The grating is clearly visible in FIG. 9b. One of the grating lines similar to line 230a of FIG. 9a is seen in FIG. 9b as line 230b.

The grating line 230b is noticably curved in FIG. 9b. The curved lines in FIG. 9b are obviously distortions of the apparent straight grating lines in FIG. 9a. These distortions are the result of non-linearity in the x and y translators used in the embodiment of FIG. 8. The translators used in this embodiment are voice coil translators originally designed and used to provide velocity correction in a video disc player as described hereinabove. The use of high linearity voice coil translators would alleviate this distortion.

Figure 10A:
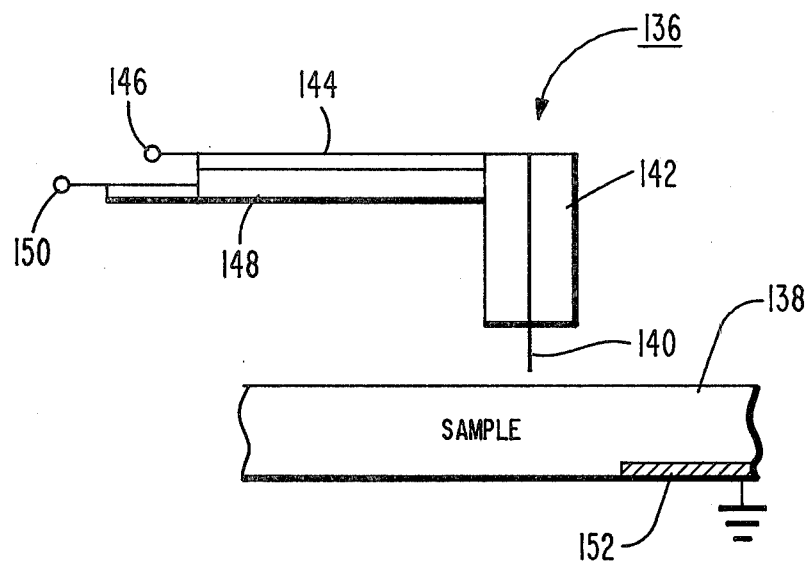
FIG. 10a and 10b are schematics in elevation and plan view, respectively, of a modified form of the capacitance probe which does not contact the surface of the material.
Figure 10B:
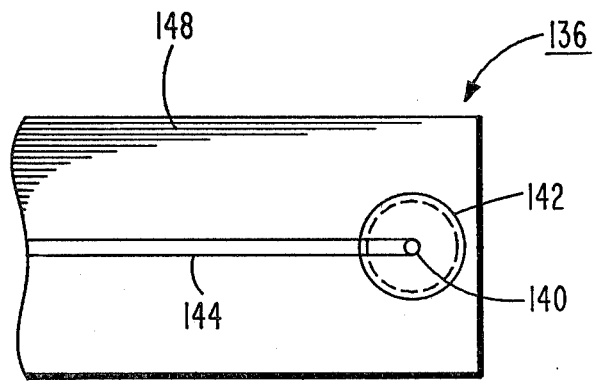

The invention can be practiced with a capacitance probe which does not contact the surface at all, thereby exerting no force on the surface. Reference is made to FIGS. 10a and 10b showing, respectively, in schematic form the elevation and plan view of a suitable probe 136 arranged to maintain capacitive coupling between the surface of the sample 138 and the electrode portion of the probe 136 without contacting the surface. The probe 136 is formed by a wire 140 of about one micron thickness extending through the center of a tube 142 of about 1000 microns in diameter filled with epoxy. The electrode 140 extends upwardly through the tube 142 and is connected to a stripline 144 arranged on the upper surface of the probe terminating at a terminal 146 for connection to the utilization circuit. The probe is carried on an arm 148 rigidly mounted at terminal 150 above the surface of the sample.

In operation, the sample 138 is moved with an appropriate raster scan relative to the probe 136 such that the electrode 140 provides a capacitive input to the circuit at terminal 146. Sample 138 is provided with a metallic portion 152 to establish the capacitive circuit to the reference ground as shown.

In the embodiment of FIG. 8 the sample 210 is fixed with the probe 204 scanning thereover. If desired, the invention may be practiced using a variation of this in which the probe 204 is fixed and the sample 210 is scanned under the fixed probe. In such an embodiment the probe 204 would be structured as disclosed in FIGS. 10a and 10b described above and the sample 210 would be translated in the X and Y directions by suitably coupling the Y and X translators 208 and 206, respectively, to effect such scanning. In another embodiment, the sample 138 (FIG. 10a) may be scanned by rotating the sample 138 while moving the probe 140 in a radial direction.

The magnification achieved by this microscope is determined in the same manner as the magnification for any scanning microscope i.e., by the relative sizes of the raster scanned on the sample and the raster scanned on the recording medium. As an example, assume we are scanning a sample and that the scanning probe will move in a square raster of width W over the sample. Then, if the recording medium (for example, a photographic film) is scanned in a square raster of width W', the magnification of the resulting micrograph is $M=W'/W$. In general, it should be understood the magnification need not be isotropic. Tus, in FIG. 9b, a nearly isotropic magnification of about 125X was used to illustrate the use of SCaM on semiconductor materials. In FIG. 6a and 6b, an anisotropic magnification of about 200X in the horizontal direction and about 50X in the vertical direction was used to illustrate the use of SCaM on video disc materials.

What is claimed is:

1. A method for determining variations in the topography and material properties of the surface layer of a body of material comprising:
   (a) scanning said surface layer with a capacitance probe to generate a first signal representing capacitance variations between the surface layer and said probe;
   (b) scanning a recording medium in synchronism with the scanning of the surface layer with said probe;
   (c) recording said first signal on the recording medium as a second signal; and
   (d) generating a visual display from said second signal from said recording medium presenting thereby capacitance variations as visually discernible variations of an image consisting of points which correlate on a one-to-one basis with points on the surface layer, the image variations manifesting features of the surface layer which cause variations in capacitance between the surface layer and the capacitance probe.

2. The method of claim 1 wherein step (d) comprises magnifying the image by a factor determined by dimensions of the rasters on the recording medium and on the surface layer.

3. The method of claim 1 in which said probe is in the form of an electrode suspended above said material by a supporting arm comprising the step of:
   scanning said surface layer with said probe by moving said body layer in an x-y raster scan while holding said probe in a fixed position.

4. The method of claim 1 in which said probe is in the form of an electrode above said surface layer comprising the step of:
   scanning said surface layer with said probe by rotating said body while moving said probe in a radial direction.

5. A method for determining variations in the topography and material properties of the surface layer of a disc upon which is impressed a spiral groove, comprising the steps of:
   (a) rotating said disc about a vertical axis;
   (b) scanning said surface layer by a capacitance probe having an electrode riding in said groove, thereby generating a scan of the disc in radius and angle to generate a capacitance signal;
   (c) recording said signal as an image on photographic film by
      (c1) generating an x-y raster scan of a cathode ray tube in synchronism with the radius and angle scan of said surface layer of said disc;
      (c2) modulating the intensity of the cathode ray tube beam with said signal to display thereby capacitance variations as visually discernible variations of an image consisting of points which correlate on a one-to-one basis with points on the surface layer, the image variations manifesting features of the surface layer which cause variations in capacitance between the surface layer and the capacitance probe; and
      (c3) photographing the image displayed on the face of the cathode ray tube.

6. A method for determining variations in the topography and material properties of the surface layer of a disc upon which is impressed a spiral groove, comprising the steps of:
   (a) rotating said disc about a vertical axis;
   (b) scanning said surface layer by a capacitance probe having an electrode riding in said groove, thereby generating a scan of the disc in radius and angle to generate a first signal;
   (c) filtering said first signal with an anti-aliasing filter to provide a second signal;
   (d) sampling said second signal with an analog to digital converter having a fixed sampling rate which is synchronized to said radius and angle scan of said surface layer to convert said second signal to digital form to provide digital samples of said second signal; and
   (e) storing said digital samples in a computer memory, said digital samples representing capacitance variations consisting of data points which correlate on a one-to-one basis with points on the surface layer, the capacitance variations representing features of the surface layer which cause variations in capacitance between the surface layer and the probe.

7. The method of claim 6 further comprising: analyzing said digital samples for digital image processing by fast-fourier transform spectral estimating, correlation, cross-correlation or coherence techniques.

8. The method of claim 6 further comprising the step of:
   generating an image from said digital samples by scanning the computer memory in synchronism with a raster scan of a cathode ray tube and modulating the intensity of the cathode ray tube beam with a signal derived from the contents of the computer memory.

9. The method according to claims 5, 6, 7, or 8 further comprising the step of:
   before rotating said disc, coating the surface with a conformal metallic layer having a thickness great enough to prevent variations in the mechanical and electrical properties of said surface layer from affecting the capacitance probe whereby only topographical variations in said surface are determined.

10. A method for determining variations in the electrical properties of the surface layer of a body of material comprising the steps of:
(a) scanning said surface layer with a capacitance probe to generate a first signal representing capacitance variations between said surface layer and said probe;
(b) scanning a recording medium in synchronism with the scanning of the surface layer with said probe;
(c) recording said first signal on the recording medium as a second signal;
(d) generating a first image from said second signal corresponding to a predetermined surface portion of said surface layer;
(d1) storing said first image in memory;
(e) coating said surface layer with a conformal metallic coating having a thickness in excess of the Thomas-Fermi shielding range for electrons in the material comprising the metal of said metallic coating, said coating being thin enough to prevent significant changes in the mechanical properties of said surface layer;
(f) after step (e) repeating steps (a) to (c) to generate a third signal representing capacitance variations and recording of said third signal as a fourth signal for generating a second image of said predetermined surface portion;
(g) generating said first image from memory; and
(h) comparing said first image to said second image to determine variations in electrical properties of said surface as manifested by the presence of features in the first image which are absent in the second image.

11. A scanning capacitance microscope for determining variations in the opography and material properties of the surface layer of a body of material comprising:
(a) means for scanning said surface layer with a capacitance probe to generate a first signal representing capacitance variations between the surface layer and said probe;
(b) means for scanning a recording medium in synchronism with the scanning of the surface layer with said probe;
(c) means for recording said first signal on the recording medium as a second signal; and
(d) means for generating a visual display from said second signal from said recording medium presenting thereby capacitance variations as visually discernible variations of an image consisting of points which correlate on a one-to-one basis with points on the surface layer, the image variations manifesting features of the surface layer which cause variations in capacitance between the surface layer and the capacitance probe.

12. The microscope according to claim 11 further including means for rotating said body and means for moving said probe in a radial direction over said layer.

13. The microscrope according to claim 11, further including a scan generator means for controlling the scan of said probe and for controlling the scan of said recording medium so that the recording medium is scanned in synchronism with said surface layer.

14. The microscope according to claim 13, wherein said probe is supported in a fixed position over said surface layer and said surface layer is translated in an X and Y scan under said probe.

15. The microscope according to claim 13, wherein said surface layer is fixed and said probe is translated over said surface in an X and Y scan.

16. The microscope according to claim 15, wherein said probe is forced against said surface layer with sufficient force to deform said surface.

17. A method of microscopy comprising continuously scanning the surface of a body with only one capacitance probe by providing relative movement between the surface and the probe to generate a continous signal representing the variation in capacitance between the body and the probe, and processing the signal to produce an image of the topography and material properties of the surface layer.

18. A method according to claim 17 wherein the image comprises an information pattern having a one to one correlation with features of topography and material properties of the surface layer.

19. A method according to claim 17 wherein the scanning step comprises scanning the body according to a predetermined scanning pattern.

20. Microscopy apparatus comprising means for continuously scanning the surface of a body with only one capacitance probe by providing relative movement between the surface and the probe to generate a continuous signal representing the variation in capacitance between the body and the probe, and processing the signal to produce an image of the topography and material properties of the surface layer.

21. An apparatus according to claim 20, wherein the image comprises an information pattern having a one to one correlation with features of topography and material properties of the surface layer.

* * * * *

UNITED STATES PATENT AND TRADEMARK OFFICE
CERTIFICATE OF CORRECTION

PATENT NO. : 4,481,616

DATED : November 6, 1984

INVENTOR(S) : James Regis Matey

It is certified that error appears in the above-identified patent and that said Letters Patent is hereby corrected as shown below:

Column 2, line 61, "surfade" should read --surface--.

Column 3, line 15, "priciple" should read --principle--.

Column 3, line 18, "convention" should read --conventional--.

Column 3, line 26, "be scanned" should read --be also scanned--.

Column 4, line 9, "camera" should read --oscilloscope--.

Column 4, line 10, "oscilloscope" should read --camera--.

Column 5, line 9, "on oscilloscope" should read --on an oscilloscope--.

Column 5, line 60, "opaque" should read --opaque--.

Column 7, line 5, "1000-5000" should read --1000-1500--.

Column 9, line 9, "microraphs" should read --micrographs--.

Column 11, line 35, "206 and 208" should read --208 and 206--.

Column 11, line 64, "in" should read --is--.

UNITED STATES PATENT AND TRADEMARK OFFICE
CERTIFICATE OF CORRECTION

PATENT NO. : 4,481,616
DATED : November 6, 1984
INVENTOR(S) : James Regis Matey

It is certified that error appears in the above-identified patent and that said Letters Patent is hereby corrected as shown below:

Column 13, line 20, "Tus" should read --Thus--.

Column 15, line 36, "opography" should read --topography--.

Signed and Sealed this

Eighteenth Day of June 1985

[SEAL]

Attest:

DONALD J. QUIGG

Attesting Officer     Acting Commissioner of Patents and Trademarks